United States Patent
Yu et al.

(10) Patent No.: US 7,453,908 B2
(45) Date of Patent: Nov. 18, 2008

(54) COMPRESSOR/DECOMPRESSOR SELECTING APPARATUS AND METHOD OF THE SAME

(75) Inventors: Tai-Xing Yu, Tainan (TW); Hong-Chi Hsu, Hsinchu (TW); Teng-Yi Huang, Taipei (TW); Ting-Kai Hung, Banciao (TW); Li-Chung Chuang, Fonglin Township, Hualien County (TW)

(73) Assignee: Industrial Technology Research Institute, Hsinchu (TW)

( * ) Notice: Subject to any disclaimer, the term of this patent is extended or adjusted under 35 U.S.C. 154(b) by 590 days.

(21) Appl. No.: 10/930,233

(22) Filed: Aug. 31, 2004

(65) Prior Publication Data
US 2005/0213610 A1    Sep. 29, 2005

(30) Foreign Application Priority Data
Mar. 26, 2004    (TW) ............................... 93108434 A (51) Int. Cl.
*H04J 3/18* (2006.01)
(52) U.S. Cl. ...................... 370/477; 370/468
(58) Field of Classification Search ................. 370/477, 370/468, 465, 357; 706/16
See application file for complete search history.

(56) References Cited

U.S. PATENT DOCUMENTS

| | | | |
|---|---|---|---|
| 6,356,545 B1 | 3/2002 | Vargo et al. | 370/355 |
| 6,427,141 B1 * | 7/2002 | Barnhill | 706/16 |
| 6,445,697 B1 * | 9/2002 | Fenton | 370/357 |
| 6,633,582 B1 * | 10/2003 | Panburana et al. | 370/465 |
| 6,754,232 B1 * | 6/2004 | Tasker | 370/477 |
| 7,002,992 B1 * | 2/2006 | Shaffer et al. | 370/468 |

* cited by examiner

*Primary Examiner*—Chi H Pham
*Assistant Examiner*—Albert T Chou
(74) *Attorney, Agent, or Firm*—Thomas, Kayden, Horstemeyer & Risley (57) ABSTRACT

A compressor/decompressor (Codec) selecting apparatus includes a performance analyzer, a training server, a storage unit, and a selecting unit. The performance analyzer analyzes the performance of the current internet communication system, and outputs environmental parameters accordingly. The training server obtains learning data corresponding to a hyperplane according to training samples. The storage unit stores the learning data and the related parameters. The selecting unit does a functional analysis according to the environmental parameters and the learning data in order to select the Codec suitable for the current internet communication system.

25 Claims, 6 Drawing Sheets

COMPRESSOR/DECOMPRESSOR SELECTING APPARATUS AND METHOD OF THE SAME

This application claims the benefit of Taiwan application Serial No. 93108434, filed Mar. 26, 2004, the subject matter of which is incorporated herein by reference.

BACKGROUND OF THE INVENTION

1. Field of the Invention

The invention relates in general to a compressor/decompressor (Codec) selecting apparatus and method of the same, and more particularly to a Codec selecting apparatus, in which the support vector machine (SVM) algorithm is used, and method of the same.

2. Description of the Related Art

As internet technology develops, internet has been applied to the telephone system to improve the efficiency of voice transmission and reduce the cost for long-distance telephone calls. In an IP telephone, a compressor/decompressor (Codec) is ordinarily used to compress raw voice data to improve the bandwidth utilization. Due to the bandwidth issue of the internet, voice quality of internet transmission will vary as different internet bandwidths under the same Codec.

For example, the Codec yielding a good quality of voice received by IP telephones in office internet having a bandwidth of 100 Mbps may provide an off-and-on voice quality as used in ordinary family internet having a bandwidth of only 64 Kbps. Therefore, it has become an important subject how to dynamically select a suitable Codec according to the system and network environments to maintain good communication quality.

Figure 1A:
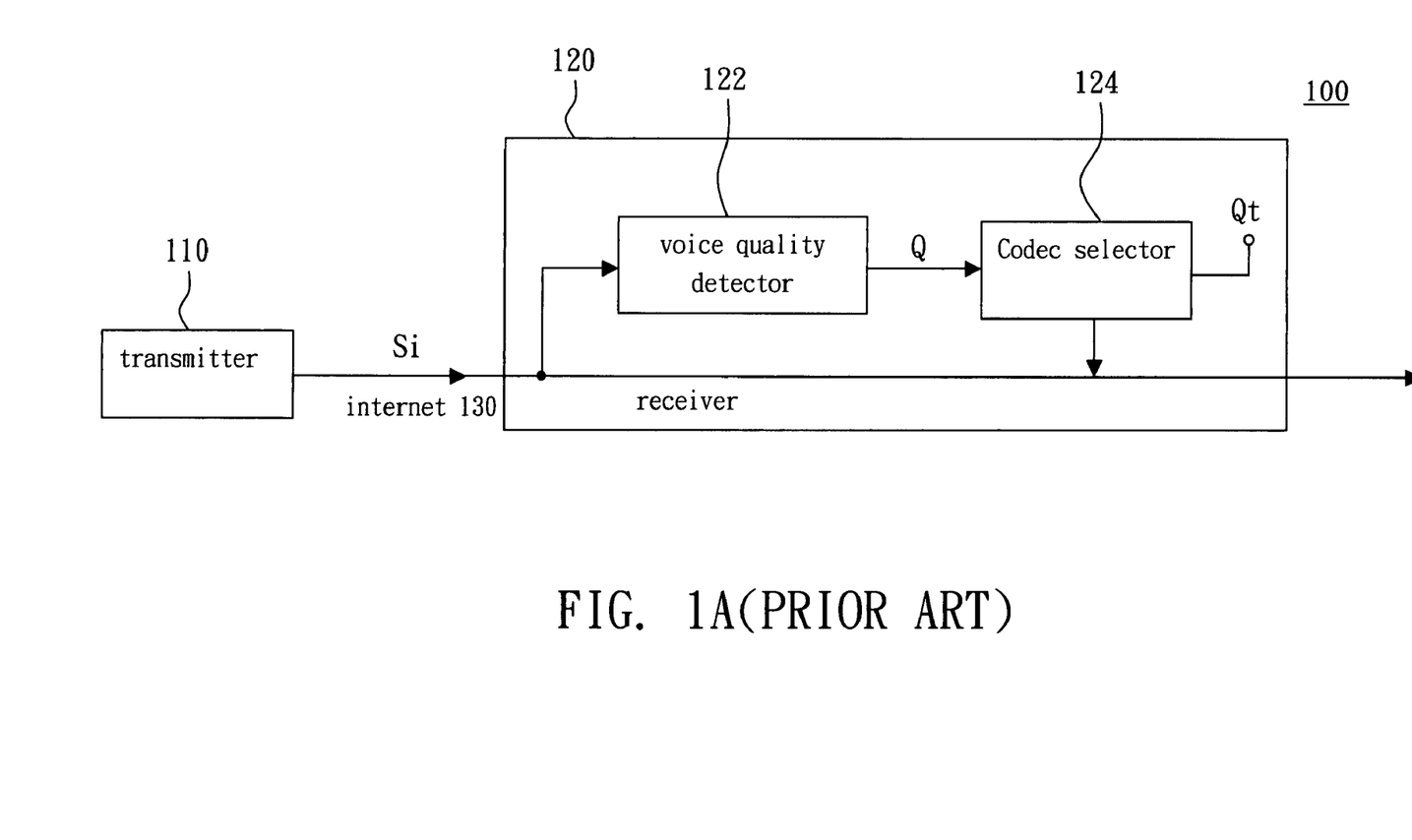
FIG. 1A is a structure diagram of the internet telephone system capable of dynamically selecting Codecs disclosed in the American U.S. Pat. No. 6,356,545.

Referring to FIG. 1A, a structure diagram of the internet telephone system capable of dynamically selecting Codecs disclosed in the American U.S. Pat. No. 6,356,545 is shown. The internet telephone system 100 includes a transmitter 110 and a receiver 120. The voice signal Si, sent out by the transmitter 110 is processed by particular Codec compression and transmitted in packet to the receiver 120. The packet is a self-describing data packet, and includes environmental information. When the receiver 120 receives the voice signal Si, it can select suitable Codec as a communication protocol by changing Codec algorithm according to the status described in the packet.

The receiver 120 includes a voice quality detector 122 and a Codec selector 124. The voice quality detector 122 detects the received voice signal Si and outputs a quality measure value Q, such as the delay status of the current packet compared to the last packet. The Codec selector 124 selects a suitable Codec by comparing the quality measure value Q with a threshold value Qt.

Figure 1B:
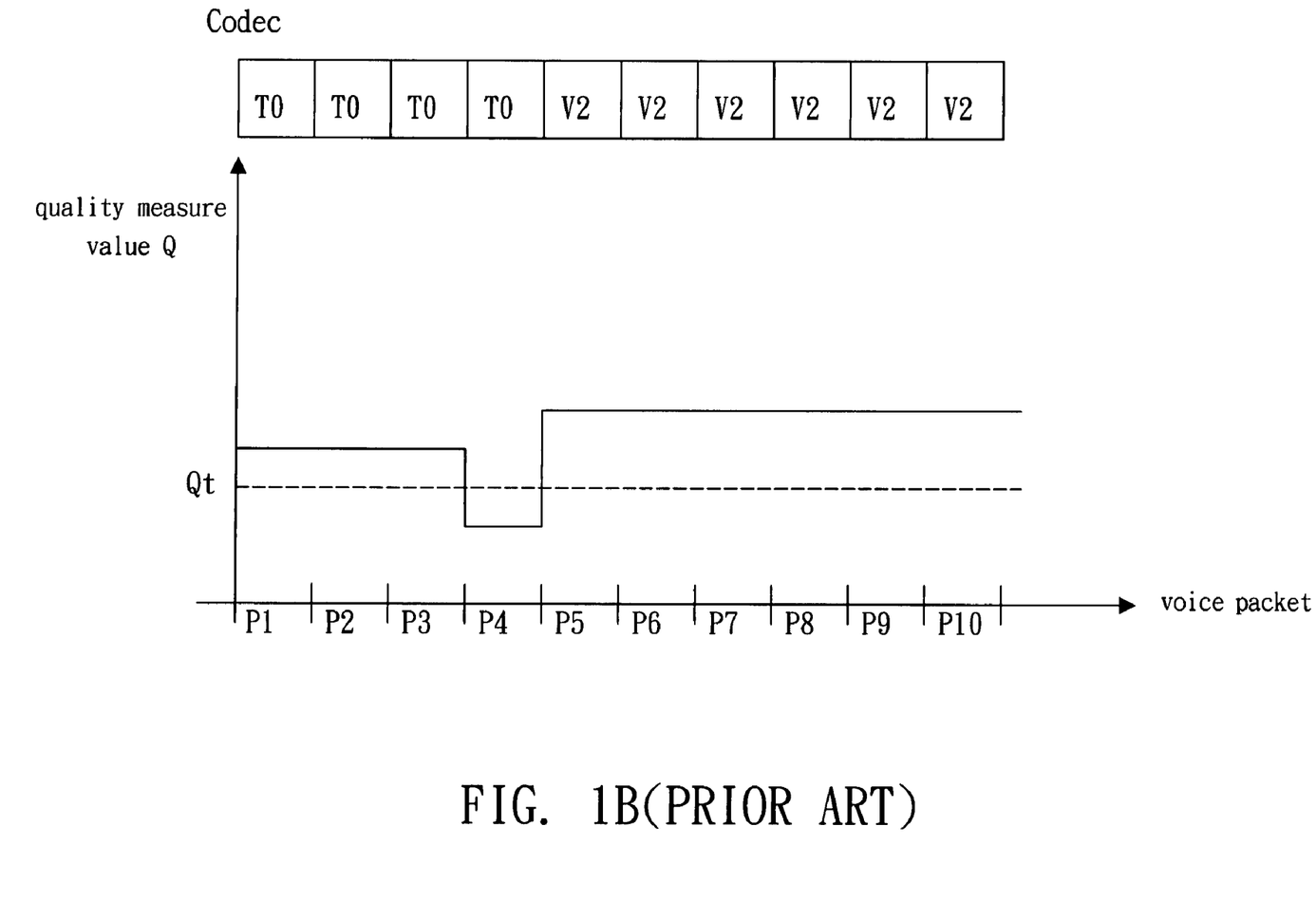
FIG. 1B is a schematic diagram of the Codec selection of the Codec selector according to difficult voice packets.

As shown in FIG. 1B, when the receiver 120 receives the packet P1 of the voice signal Si by using Codec 'T0', the corresponding quality measure value Q is larger than the threshold Qt. It means that the Codec selector 124 can continuously use the Codec 'T0', After receiving the next packet P2, since the quality measure value Q corresponding the packet P2 is still larger than the threshold value Qt, the Codec 'T0' will be not changed when receiving the packets P3 and P4 of the voice signal Si. When the packet P4 is received, the quality measure value Q becomes smaller than the threshold value Qt, it means the Codec 'T0' is not suitable for the next packet any more and thus the Codec selector 124 selects to use Codec 'V2' to receive the next packet P5. Since the quality measure values Q corresponding to the packets P5~P9 are all larger than the threshold value Qt, the Codec selector 124 selects Codec 'V2' to receive the packets P6~P10.

However, the conventional dynamical Codec selecting method mentioned above has the following disadvantages:

1. The dynamical Codec selecting mechanism changes the Codec according to a one-dimensional threshold value. However, the voice packet has a lot of environment parameters, including the bandwidth, the delay status, the latency, and the response time of the internet, and the memory and CPU utility status of the receiver. For this reason, the precise Codec is difficult to provide by using only one quality measure value in comparison to the threshold value.

2. Since the communication system is close-looped, in which the transmitter and the receiver have to communicate through the same communication structure. The communication method is not compatible to the well-known internet communication standard, such as SIP or H.323.

3. The voice packet has more overheads for the requirement of bringing extra information, so the real data amount carried in the voice packet is reduced.

SUMMARY OF THE INVENTION

It is therefore an object of the invention to provide a Codec selecting apparatus and method of the same. According to the environmental parameters and using the SVM algorithm, the Codec suitable for the present system environments can be selected, and the precision of the selected Codec can be improved by renewing the training samples in a learning process via the SVM algorithm. The Codec selecting method in the invention is compatible to the well-known internet communication standard.

The invention achieves the above-identified object by providing a Codec selecting apparatus for selecting a Codec according to an internet communication system, the Codec selecting apparatus includes a performance analyzer, a training server, a storage unit, and a selecting unit. The performance analyzer is used for analyzing the performance of the current internet communication system, and accordingly outputting environmental parameters. The training server receives training samples and accordingly outputs learning data. The learning data is corresponding to a hyperplane. The storage unit is used for storing the learning data. The selecting unit selects the Codec suitable for the current internet communication system according to the environmental parameters and the learning data.

The environmental parameters and the corresponding Codec are input to the training server as training samples for training to renew the learning data. Each of the training samples includes the environmental parameters corresponding to the internet communication system and the Codec corresponding to the environmental parameters. The training is done by SVM algorithm in the training server. The learning data is corresponding to coefficients of the hyperplane, and kernel parameters of the kernel function used in the SVM calculation. Therefore, by using the learning mechanism in the training server to obtain better learning data as a judge basis of the selecting unit, the Codec suitable for the current system environments can be precisely selected.

The invention achieves the above-identified object by providing a Codec selecting method for selecting a Codec according to an internet communication system. The method includes analyzing the performance of the current internet communication system to obtain a plurality of environmental parameters; having a training according to training samples to obtain learning data, wherein each of the learning data is corresponding to a hyperplane; and performing a analysis of the hyperplane and environmental parameters to select the Codec suitable for the current internet communication system.

The learning data are obtained by a SVM training process on the training samples including the environmental parameters and the corresponding Codec. The step of selecting the Codec suitable for the current internet communication system comprises adjusting the training samples according to the environmental parameters and the corresponding Codec of the current internet communication system in order to renew the learning data. Therefore, by using the SVM algorithm, the Codec suitable for the current system environments can be precisely selected.

Other objects, features, and advantages of the invention will become apparent from the following detailed description of the preferred but non-limiting embodiments. The following description is made with reference to the accompanying drawings.

DETAILED DESCRIPTION OF THE INVENTION

The feature of the invention lies on using novel SVM technique to select the required Codec, which has rapid learning capability and good performance, and can select most suitable Codec according to communication environments. The invention has learning mechanism, which can renew learning data as a judge basis for Codec selection according to the training samples input by the user. Moreover, the Codec selecting method of the invention can be compatible to the standard of the well-known internet communication system.

Figure 2:
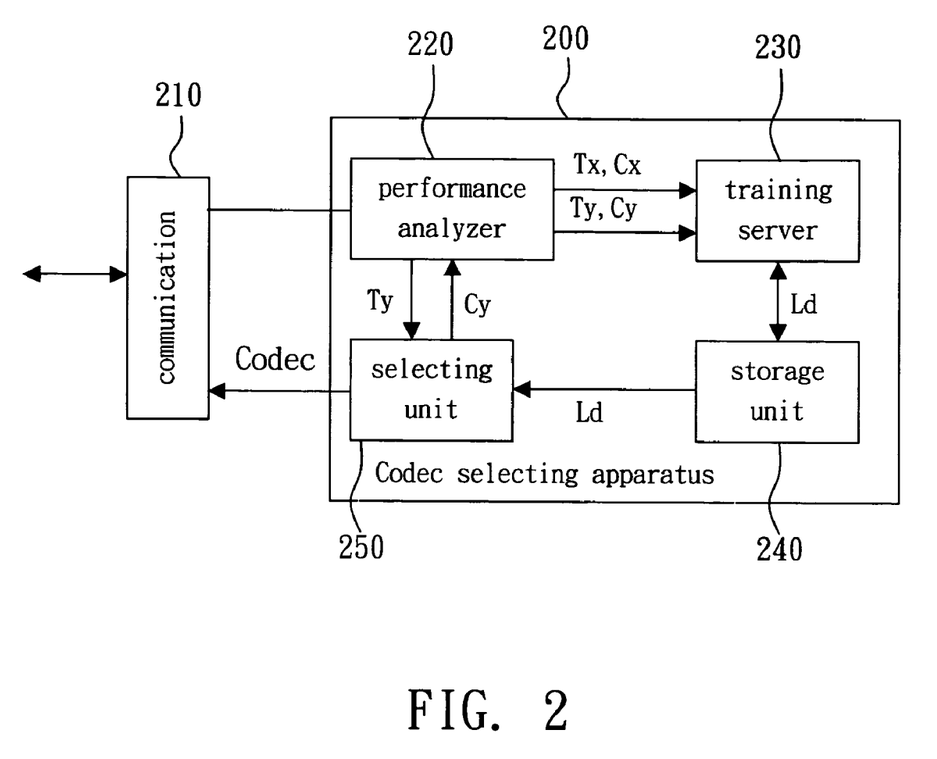
FIG. 2 is a structure diagram of the Codec selecting apparatus according to a preferred embodiment of the invention.

Referring to FIG. 2, a structure diagram of the Codec selecting apparatus according to a preferred embodiment of the invention is shown. The Codec selecting apparatus 200 is used to provide a suitable Codec for the communication means 210. The Codec selecting apparatus 200 includes a performance analyzer 220, a training server 230, a storage unit 240 and a selecting unit 250. The performance analyzer 220 is used for analyzing the performance of the current internet communication system and outputting environmental parameters Tx, which include a system performance parameter and an internet status parameter. The internet performance parameter records one of or any combination of the memory utility status, the CPU calculation power, and the CPU utility rate of the communication means 210, and the parameters related to Codec calculation. The internet status parameter records one of or any combination of the bandwidth, the delay status, the latency, the packet loss, and the response time of internet connected to the communication means 210.

Furthermore, the training server 230 has a SVM calculation training to output learning data Ld as learning results, wherein n, m are natural numbers, according to the environmental parameters Tx (x=1~n, Tx is a vector of m×1) gathered by the performance analyzer 220 and n training samples $S=\{(Tx, Cx)\}_{x=1}^{n}$ formed by the most suitable Codec Cx for the environments corresponding to the parameters Tx. Each of the learning data Ld includes coefficients $\alpha_0, \alpha_1, \ldots \alpha_n$ corresponding to a (n+1)-dimensional hyperplane, support vectors Sv, a subclass of training samples S, and parameters related to the kernel function, which can be a polynomial function $K_p(x,y)=(x \cdot y+1)^p$ or a Gauss function $K_G(x,y)=e^{-\mu\|x-y\|^2}$ or any function Kx defined by the user. The storage unit 240 is used to store the learning data Ld. The selecting unit 250 performs SVM calculation and analysis to output the Codec and the related parameters suitable for system environments according to the environmental parameters Ty of the current internet communication system and the learning data Ld stored in the storage unit 240.

Figure 3A:
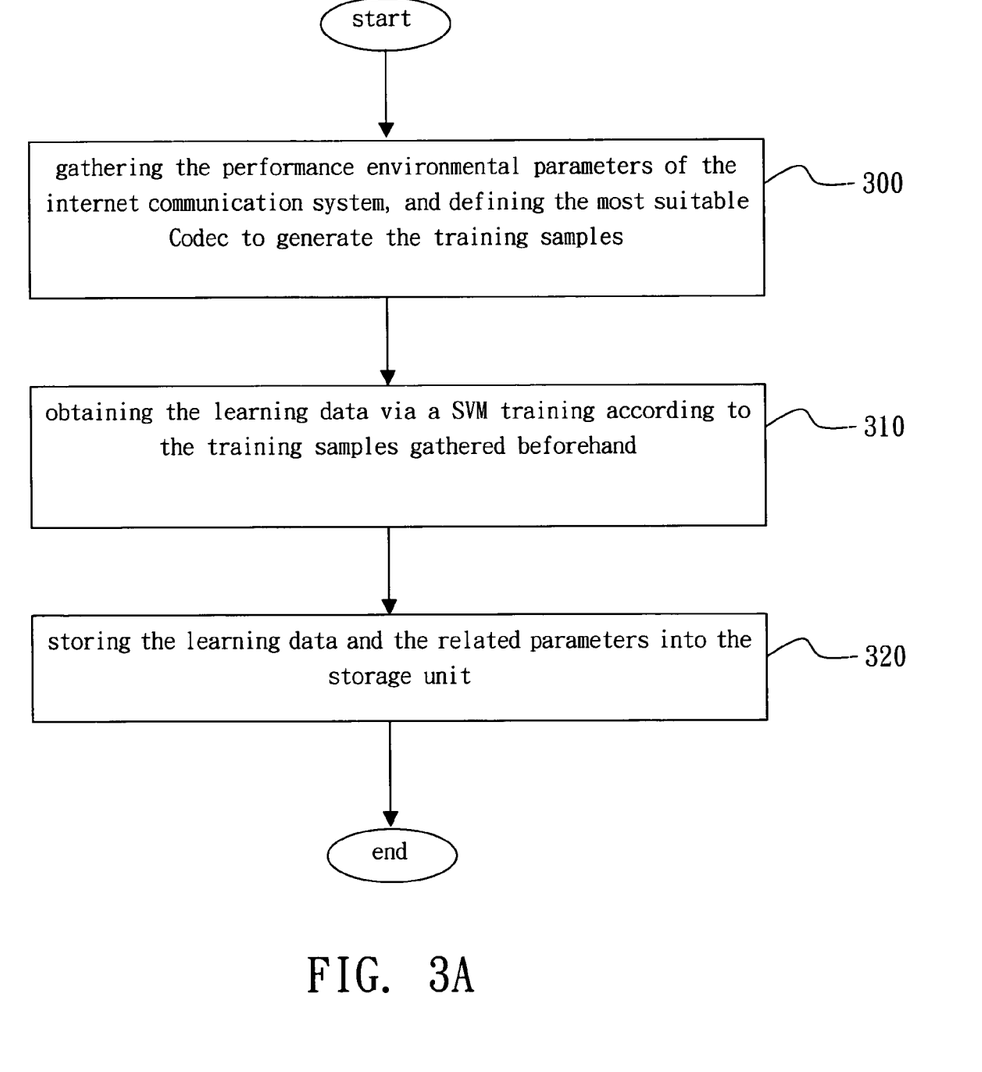
FIG. 3A is a learning approach flow chart according to the preferred embodiment of the invention.

Referring to FIG. 3A, a learning approach flow chart according to the preferred embodiment of the invention is shown. First, in the step 300, the environmental parameters Tx of the internet communication system are gathered, such as the above-mentioned system performance parameter and internet status parameter, the suitable Codec Cx is defined and the training samples S are generated according to the system environment. Next, in the step 310, the learning data Ld are provided via a SVM training according to the n training samples $S=\{(Tx,Cx)\}_{x=1}^{n}$ gathered beforehand. In this process, the training samples S are mapped to a high-dimensional feature space via the suitable kernel function $K_P$, $K_G$, or $K_x$ to get better learning results. Last, in the step 320, the provided learning data Ld are stored into the storage unit 240 as a judge basis for the selecting unit 250.

Figure 3B:
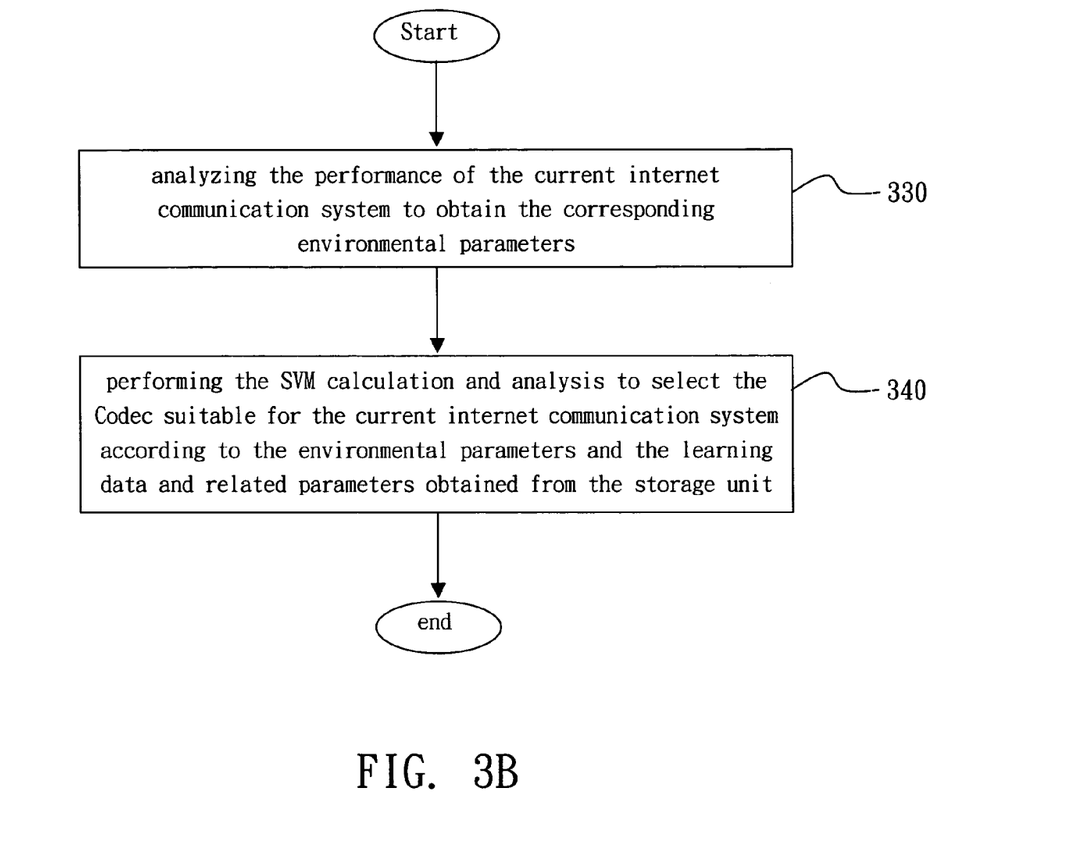
FIG. 3B is a flow chart of the Codec selecting method according to the preferred embodiment of the invention.
Figure 4:
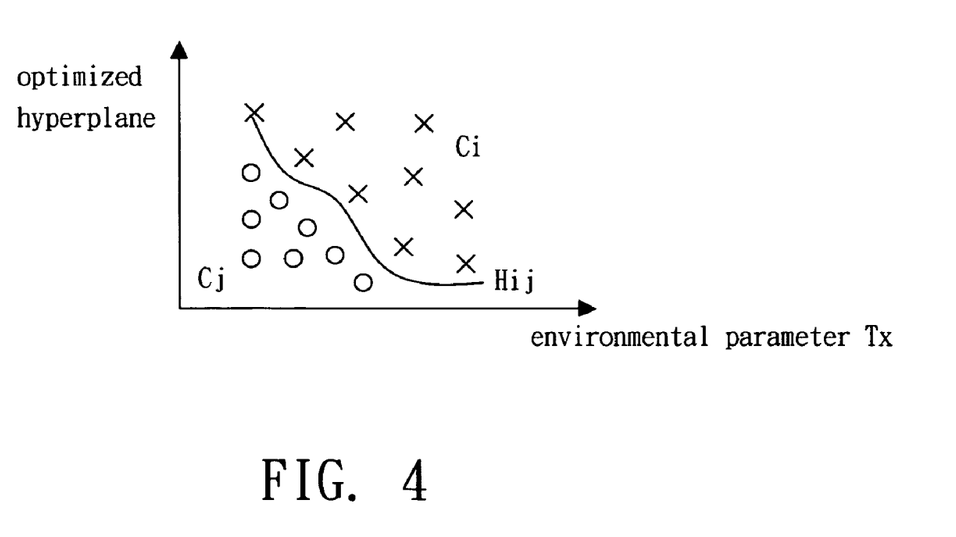
FIG. 4 is a schematic diagram of the environmental parameter Tx distribution and Codec regions divided by the hyperplane.

Referring to FIG. 3B, a flow chart of the Codec selecting method according to the preferred embodiment of the invention is shown. First, in the step 330, the performance of the current internet communication system is analyzed and the corresponding environmental parameters Tx are output, such as the above-mentioned system performance parameter and internet status parameter. Every time when the user has an IP telephone call, the performance of the internet communication system will be analyzed. After the phone call is setup, the system performance can be analyzed once for a period of time, such as five minutes. Next, in the step 340, the SVM calculation is performed to select the Codec suitable for the current internet communication system. In the SVM training process, the environmental parameters Tx are mapped to a high-dimensional feature space according to the learning data Ld and the kernel function $K_P$, $K_G$, or $K_x$. This high-dimensional feature space includes a hyperplane formed by the learning data Ld and the kernel function via the SVM training, and the hyperplane divides the high-dimensional feature space into the Codec Ci regions. The hyperplane between the regions of Codecs Ci and Cj is taken as an example. As shown in FIG. 4, the learning data Ld are mapped to a (n+1)-dimensional hyperplane Hij. Therefore, if the corresponding function point of the system environmental parameters is located in the region Ci above the hyperplane Hij, the selecting unit 250 selects Codec Ci for communication handshake. In the contrary, if the corresponding functional point of the system environmental parameters is located in the region Cj below the hyperplane Hij, the selecting unit 250 selects Codec Cj for communication handshake. Therefore, the Codec suitable for the current system environmental parameters can be selected by judging from the hyperplane Hij ($1 \leq i, j \leq n$).

In addition to the off-line training according to the beforehand gathered training samples $S=\{(Tx,Cx)\}_{x=1}^{n}$, the Codec selecting method of the invention can also perform an on-line learning, in which the training samples are adjusted and the learning data Ld are renewed via a SVM calculation training according to the current gathered environmental parameters Ty and the selected Codec Cy related to the environmental parameters Ty.

Although the SVM technique is taken as an example in the invention, the Codec selecting method of the invention can be also performed via any other algorithm. As long as the functional convergence is provided, and the high-dimensional hyperplane corresponding to the environmental parameters and Codecs can be obtained by the given training samples to precisely select the Codec suitable for the system environment.

According to the above-mentioned preferred embodiment, the Codec selecting apparatus of the invention has the following advantages:

1. The Codec selecting apparatus has learning mechanism, which can have an off-line learning according to the related parameters gathered beforehand by the training server, or have an on-line learning according to the current environmental parameters and the selected Codecs, and store the learning results as the selecting basis for the selecting unit. Therefore, the training samples can be renewed and the Codec selection can be made more precisely.

2. The SVM algorithm used in the Codec selecting method can be proved to have high precision by theory and provides a rapid learning ability and good performance.

3. The Codec selecting apparatus can be integrated to any internet communication means using multi-Codecs, and is compatible to the well-known internet telephone system standard.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A compressor/decompressor (Codec) selecting apparatus, for selecting a Codec according to an internet communication system, the Codec selecting apparatus comprising:
   a performance analyzer, for analyzing the performance of the current internet communication system, and accordingly outputting a plurality of environmental parameters;
   a storage unit, for storing a plurality of learning data obtained through a support vector machine (SVM) calculation, wherein each of the learning data forms a hyperplane in a high-dimensional feature space, and the hyperplanes divide the high-dimensional feature space into a plurality of Codec regions; and
   a selecting unit, for performing the SVM calculation to select the Codec suitable for the current internet communication system by determining the Codec region comprising a function point in the high-dimensional space mapped by the environmental parameters.

2. The selecting apparatus according to claim 1, wherein the environmental parameters record any combination of a system performance parameter and an internet status parameter.

3. The selecting apparatus according to claim 2, wherein the Codec selecting apparatus is applied in a communication means and the system performance parameter records one of or any combination of parameters of the memory utility status, the CPU calculation power, and the CPU utility rate of the communication means, and the parameters related to the Codec calculation.

4. The selecting apparatus according to claim 2, wherein internet status parameter records one of or any combination of the bandwidth, the delay status, the latency, the packet loss, and the response time of the internet connected to the communication means.

5. The selecting apparatus according to claim 1, wherein the Codec selecting apparatus comprises a training server, and the training server receives a plurality of training samples, and accordingly performs SVM calculation to output and store the learning data into the storage unit.

6. The selecting apparatus according to claim 5, wherein each of the training samples comprises the environmental parameters corresponding to the internet communication system and the Codec corresponding to the environmental parameters.

7. The selecting apparatus according to claim 6, wherein the environmental parameters and the corresponding Codec are input to the training server as training samples for SVM calculation in order to renew the learning data.

8. A Codec selecting apparatus, for selecting a Codec according to an internet communication system, the Codec selecting apparatus comprising:
   a performance analyzer, for analyzing the performance of the current internet communication system, and accordingly outputting a plurality of environmental parameters;
   a training server, for receiving a plurality of training samples and accordingly outputting a plurality of learning data through a SVM calculation, wherein each of the learning data is corresponding to a hyperplane in a high-dimensional feature space mapped by the training samples, and the hyperplanes divide the high-dimensional feature space into a plurality of Codec regions;
   a storage unit, for storing the learning data; and
   a selecting unit, for performing the SVM calculation to select the Codec suitable for the current internet communication system by determining the Codec region comprising a function point in the high-dimensional space mapped by the environmental parameters.

9. The selecting apparatus according to claim 8, wherein the environmental parameters record any combination of a system performance parameter and an internet status parameter.

10. The selecting apparatus according to claim 8, wherein the environmental parameters and the corresponding Codec are input to the training server as training samples to renew the learning data.

11. The selecting apparatus according to claim 8, wherein each of the training samples comprises the environmental parameters corresponding to the internet communication system and the Codec corresponding to the environmental parameters.

12. The selecting apparatus according to claim 8, wherein the training is done by SVM algorithm in the training server.

13. The selecting apparatus according to claim 12, wherein each of the learning data is corresponding to a plurality of coefficients of the hyperplane function, the training samples, and kernel parameters of the kernel function used in the SVM calculation.

14. A Codec selecting method, for selecting a Codec according to an internet communication system, the selecting method comprising:

analyzing the performance of the current internet communication system to obtain a plurality of environmental parameters;

obtaining a plurality of learning data through a SVM calculation, wherein each of the learning data forms a hyperplane in a high-dimensional feature space and the hyperplanes divide the high-dimensional feature space into a plurality of Codec regions; and performing the SVM calculation to determine the Codec region comprising a function point in the high-dimensional feature space mapped by the environmental parameters and accordingly select the Codec suitable for the current internet communication system.

15. The selecting method according to claim 14, wherein the environmental parameters record any combination of a system performance parameter and an internet status parameter.

16. The selecting method according to claim 15, wherein the Codec selecting method is applied in a communication means, and the system performance parameter records one of or any combination of parameters of the memory utility status, the CPU calculation power, and the CPU utility rate of the communication means, and parameters related to Codec calculation.

17. The selecting method according to claim 15, wherein the internet status parameter records one of or any combination of the bandwidth, the delay status, the latency, the packet loss, and the response time of the internet connected to the communication means.

18. The selecting method according to claim 14, wherein the training samples comprise the environmental parameters and the Codec corresponding to the environmental parameters.

19. The selecting method according to claim 18, wherein the step of selecting the Codec suitable for the current internet communication system comprises adjusting the training samples according to the environmental parameters and the corresponding Codec of the current internet communication system in order to renew the learning data.

20. A Codec selecting method, for selecting a Codec according to an internet communication system, the selecting method comprising:

analyzing the performance of the current internet communication system to obtain a plurality of environmental parameters;

having a training according to a plurality of training samples to obtain a plurality of learning data through a SVM calculation, wherein each of the learning data is corresponding to a hyperplane in a high-dimensional feature space mapped by the training samples, and the hyperplanes divide the high-dimensional feature space into a plurality of Codec regions; and determining the Codec region comprising a function point in the high-dimensional feature space mapped by the environmental parameters to select the Codec suitable for the current internet communication system.

21. The selecting method according to claim 20, wherein the environmental parameters record any combination of a system performance parameter and an internet status parameter.

22. The selecting method according to claim 20, wherein each of the training samples comprises the environmental parameters corresponding to the internet communication system and the Codec corresponding to the environmental parameters.

23. The selecting method according to claim 20, wherein the learning data are obtained by a SVM calculation on the training samples.

24. The selecting method according to claim 23, wherein each of the learning data is corresponding to a plurality of coefficients of the hyperplane, the required training samples, and kernel parameters of the kernel function used in the SVM calculation.

25. The selecting method according to claim 20, wherein the step of selecting the Codec suitable for the current internet communication system comprises adjusting the training samples according to the environmental parameters and the corresponding Codec of the current internet communication system in order to renew the learning data.

* * * * *